March 23, 1926.

R. WYMAN

SPOON RACK FOR KETTLES

Filed April 2, 1923

1,577,510

INVENTOR
Ruby Wyman.
BY Adam E. Fisher.
ATTORNEY

Patented Mar. 23, 1926.

1,577,510

UNITED STATES PATENT OFFICE.

RUBY WYMAN, OF OLYMPIA, WASHINGTON.

SPOON RACK FOR KETTLES.

Application filed April 2, 1923. Serial No. 629,240.

*To all whom it may concern:*

Be it known that I, RUBY WYMAN, a citizen of the United States, residing in the city of Olympia, county of Thurston, and State of Washington, have invented new and useful Improvements in Spoon Racks for Kettles, of which the following is a specification, reference being had to the accompanying drawings.

This invention is in the way of a spoon rack for kettles, and the object is to provide a simple, efficient and practicable device which may be readily attached to the edge of a kettle or the like and will serve to support the cooking spoon or other like culinary implement, in convenient position for ready use at all times; and will also serve to always drain the spoon back into the kettle and prevent the soiling of a table or the like from the drippings of the spoon.

Figure 1:
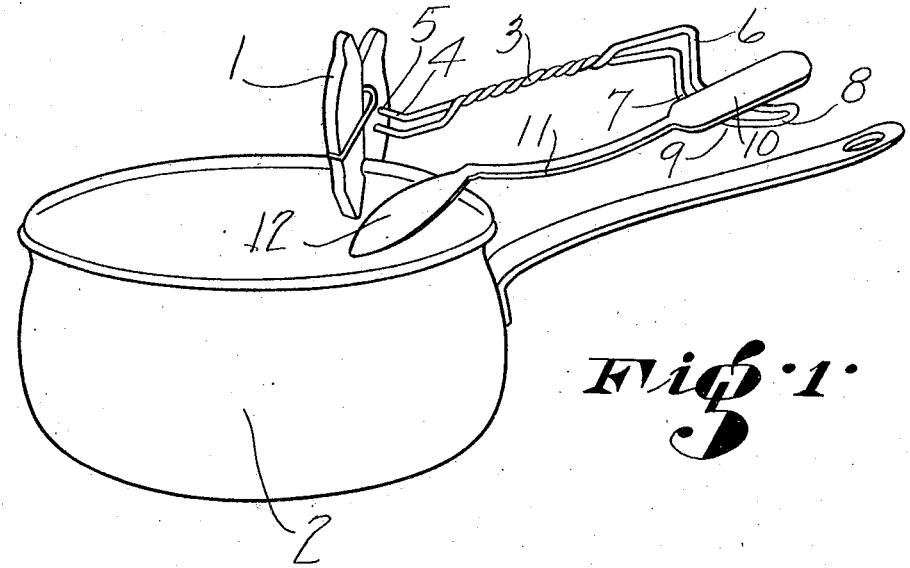
Figure 1 is a perspective view showing the spoon in use.
Figure 2:
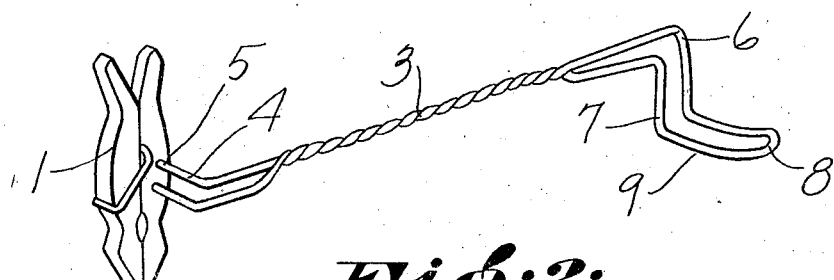
Figure 2 is a perspective view of the tool itself.
Figure 3:
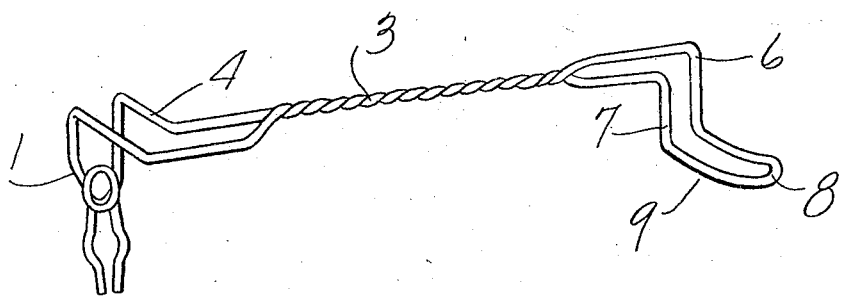
Figure 3 is a perspective view of a modified form of construction, showing how the tool may be made entirely of wire.

The invention consists of a spring-set clamp 1 adapted to releasably engage the edge of the kettle 2, the clamp having a backwardly extended arm 3, the forward end of which is turned laterally at 4 to form a juncture at the point 5 with the side of the clamp 1, and the other end of which is turned angularly downward to the point 6 and then laterally outward at 7 in a direction opposite to the bend 4, the extremity 8 being turned upward, and the whole forming a rack 9 upon which the handle 10 of the spoon 11 may rest so that the bowl 12 of the spoon resting upon the edge of the kettle will drain into the kettle 2. Instead of the elaborate clamp as shown in Figure 1, the entire device, including the clamp, may be formed of wire as shown in Figure 3. The operation and use of the device are apparent and it will be noted that the spoon rests in place merely of its own weight and without any clamp whatever holding or engaging the spoon itself.

While I have herein described a certain specific manner and method of constructing and assembling the elements of my invention, it is understood that I may vary from the same in minor details, not departing from the spirit of the invention, so as to best construct a practical device for the purpose intended, as defined in the appended claim.

I claim:

A spoon rack for kettles formed entirely of wire and including a spring clamp for engaging the side of the kettle, a laterally and backwardly extended arm having its outer end turned angularly downward and laterally outward in a direction opposite to the lateral bend of the arm connecting with the clamp.

RUBY WYMAN.